UNITED STATES PATENT OFFICE.

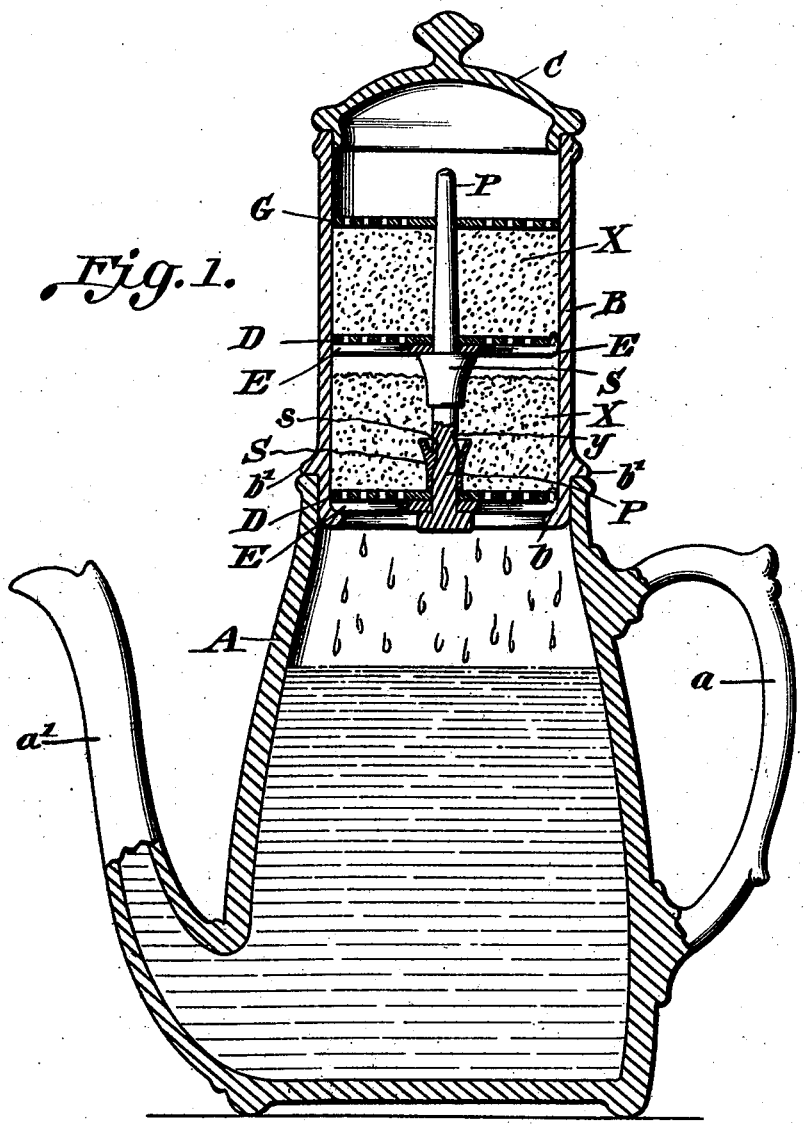

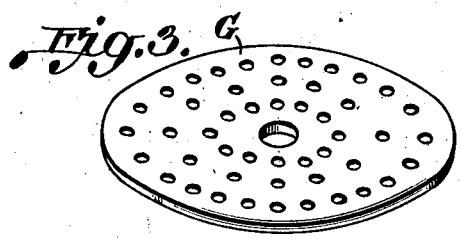
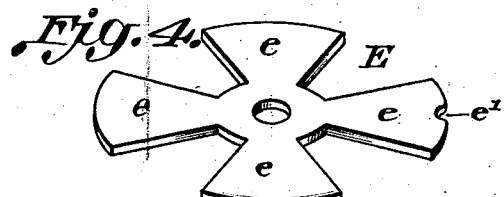
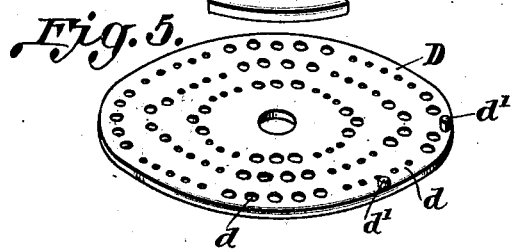
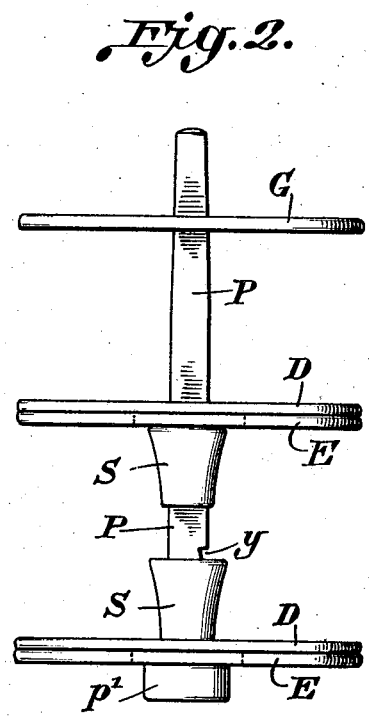
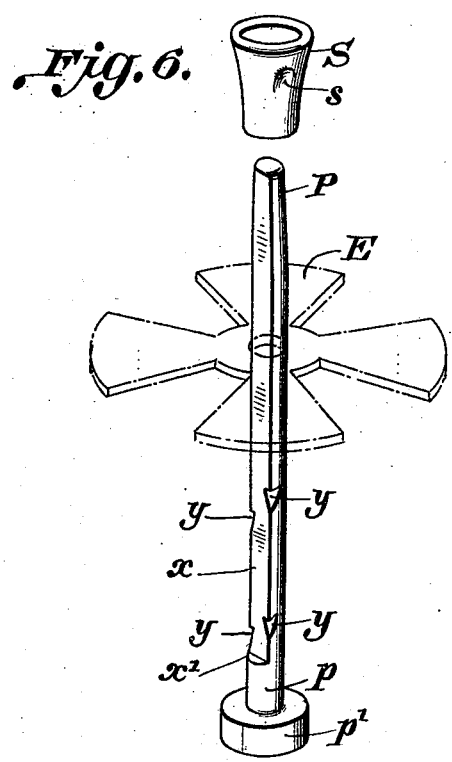

EDWIN S. GARDINER, OF NEW ORLEANS, LOUISIANA.

DRIP COFFEEPOT.

1,418,436. Specification of Letters Patent. Patented June 6, 1922.

Application filed September 29, 1921. Serial No. 504,203.

*To all whom it may concern:*

Be it known that I, EDWIN S. GARDINER, a citizen of the United States, residing in New Orleans, in the parish of Orleans and State of Louisiana, have invented certain new and useful Improvements in Drip Coffeepots, of which the following is a specification.

This invention relates to coffee pots of the general kind shown in my United States Patent No. 1,389,299, of August 30, 1921. That patent shows a coffee pot in which the ground or cut coffee is contained in a holder which can be adjusted to accommodate coffee ground fine or coarse, or steel cut in any usual way. A feature of the invention shown in said patent is the construction by which the members of the holder may be taken apart, cleaned and re-assembled. One of the principal objects of my present invention is to provide devices for more quickly connecting the members of the holder and more easily taking them apart. When the coffee pot is made entirely of china, earthenware, glass, or similar material it is important that the securing devices employed should be such that they may be made by practical processes and they should also be such that the members will not be liable to break when being connected or taken apart. I find that while the threaded nuts used in the construction shown in my prior patent are serviceable, when the members are made of metal better results are obtained, when the members are of china, by using other devices for holding the drip members in place and I have also found that it is desirable to employ securing devices which can be more quickly operated.

According to my present invention I employ one or more perforated plates in the coffee holder, as heretofore, and I support them on a rod, but this rod is of novel construction. It has a part or side which is flat, and another part which is curved and is formed with notches or teeth and the rod thus formed is associated with a slide which in one position may be moved freely, but which when given a partial turn may be locked on the rod. The arrangement is such that the slide may be set at the desired position on the rod in such manner as to support the perforated plate with which it is associated at the desired point, but the plate may be quickly removed from the rod when desired by a quick movement which will unlock the slide from the rod, remove it therefrom and allow the plate to be disconnected from the rod. A plurality of slides may be associated with the rod so as to support a plurality of discs or plates. Other features of the invention will be hereinafter described.

In the accompanying drawings,

Figure 1 shows a vertical section through a drip-coffee pot embodying my improvements;

Figure 2 is a side elevation of the plate-supporting rod with perforated plates thereon associated with covering plates and with slides which support the parts;

Figure 3 is a perspective view of a perforated plate which when in use is made to rest on the top of a body of ground or cut coffee;

Figure 4 is a perspective view of one of the cover plates;

Figure 5 is a perspective view of one of the perforated drip plates;

Figure 6 is a perspective view of the notched supporting rod, a slide and a cover plate.

A coffee pot A, of well-known construction, is provided with a handle $a$ and a spout $a'$. B indicates the receptacle for coffee and for the coffee-holding devices. Both the pot and the receptacle B are preferably made of china or similar material and the receptacle B is formed at its lower end with a bead $b$, for a purpose hereinafter explained. It is also formed with a flange or bead $b'$, which rests on the top of the coffee pot. The cover C, which is also preferably of china, is of well-known construction and rests on top of the receptacle B in the manner shown. When the cover is removed water may be poured into the receptacle B and after passing through the coffee-holding devices and the coffee, drips into the pot A in the manner indicated.

The coffee-holding devices are also preferably all made of china or similar material for sanitary reasons. These coffee-holding devices are somewhat similar to the devices shown in my prior patent. As heretofore, I employ perforated drip plates D and cover-plates E. These are similar to those shown in my prior patent. Each disc or plate D is formed with groups of perforations $d$, of different sizes. In this instance there are eight different groups and two different sizes of perforations, but these may be varied. Each group, as shown, is sector-shaped but this shape is not essential. The cover-plate shown in Fig. 4 comprises four sector-shaped cover members e and this plate is so formed that it may be made to completely cover at one time four of the groups of perforations in the drip plate D, but may if preferred be made to cover partially eight of the groups of perforations. The plate G, shown in Fig. 3, is a perforated plate, but is not associated with a cover-plate, and is intended to be used in the manner shown in Fig. 1—that is to say it rests, when in use, on a body of coffee X, in the upper part of the receptacle B. As shown in Fig. 1, two perforated plates D are mounted in the dripper and each of these is associated with a cover-plate E. Generally speaking, therefore, the construction or arrangement is similar to that shown in my prior patent, but it has been found that the winged nuts shown in my prior patent are not best adapted for use when the parts are made of china or similar material. To overcome these difficulties, I have devised novel means for mounting the perforated plates and cover-plates and for holding them in place so that they may be removed bodily or simultaneously from the pot. It will be observed that the perforated plates and cover-plates are placed on a rod P. This rod is circular in cross-section at $p$, and has a knob or bottom flange $p'$. Above the part $p$ the rod is cut away on one side longitudinally so as to provide a flat side $x$, which is straight, and flat from one end $x'$ to its opposite end. The remainder of the body of the rod is curved or partially cylindrical, the cylindrical contour being interrupted only by the flat side $x$. Near the edge of the flat side $x$ there is a notch $y$ and I may employ a plurality of such notches, as shown, and if desired, notches on opposite sides of the flat side $x$ may be employed, although in some cases a single notch is sufficient. In connection with the rod thus constructed I employ a slide S. This may be variously shaped, but preferably is of the kind shown. It is in the form of a sleeve, which fits over the rod P, the bore or interior of the sleeve being curved to correspond with the curvature of the rod, but it is also formed with a tooth $s$, which projects inwardly and is adapted to move longitudinally on the flat side $x$ of the rod freely and as rapidly as may be desired. By giving a partial turn to the slide its tooth $s$ may be made to engage with the notch $y$, or with either of the notches on opposite sides of the part $x$, and when so engaged the slides will be securely locked and held firmly in place.

As shown in Fig. 1, the slide S is so mounted as to hold a perforated plate D and a cover-plate E in position on the rod above the knob or flange $p'$, and it will be observed that at this time the tooth $s$ is in engagement with the notch $y$ of the rod. In like manner another slide S is arranged below the perforated plate D and the cover-plate E and serves to support the plates as shown. When the parts are mounted, as shown in Fig. 1, with bodies of coffee X in the holder the cover C may be removed and boiling water poured in to the receptacle. The boiling water passes down through the perforated plate G, through the coffee and through the perforated plates and cover-plates and drips into the pot in the manner shown. The cover-plates may be adjusted to regulate the passage of the boiling water through the dripper and when it is desired to clean the parts the cover C is removed and the rod with the parts carried thereby may be withdrawn from the holder. The plate G may be lifted off from the rod, as may also the upper plates D and E. The slides S may be given a partial turn, lifted from the rod and then the lower plates may be quickly detached. These parts may be thoroughly cleaned and replaced in an obvious way.

By employing a construction of the kind herein shown and described, all parts, including the perforated plates, cover-plates, supporting-rod and slide, may be made of china or similar material. So far as I am aware, it has not heretofore been possible to construct a drip-coffee pot entirely of china or similar material possessing the characteristics of my invention. Should any one desire to dispense with the perforated drip plates and cover-plates D and E and their supporting rod, the perforated disc G only need be used. This may be made to rest on the ledge $b$ of the receptacle B and will serve fairly well to support the coffee and allow the liquid to drip through it, but experience has demonstrated that superior results are attained when using a plurality of perforated plates with their openings properly adjusted. When the plate G is used as a drip plate, the central hole therein obviously must be closed in some suitable way.

The perforated plates D are provided with pins or lugs $d'$, spaced apart as shown in Fig. 5, and each cover-plate is formed with a notch $e'$. By these devices the cover-plates may be adjusted and held in place against a rotary movement, being also held securely on the rod by the slides, as hereinbefore explained.

If preferred, the pins may be placed on the cover plates and the notches formed in the perforated plates as shown in Fig. 1.

I claim as my invention:

1. The combination with a coffee pot, of a coffee-holder comprising a receptacle for coffee, a supporting rod having a flat side extending longitudinally thereof and formed with a notch near its edge, a perforated drip-plate and a slide for holding the drip-plate in place on the rod which is provided with a tooth adapted to slide freely on the flat side of the rod and to engage the notch on the rod when given a partial turn.

2. A coffee-holder for drip-coffee pots comprising a receptacle for coffee, a rod having one of its sides flat and formed with a locking notch near its edge, a slide having a tooth adapted to move freely longitudinally of the rod when opposite the flat side thereof but to engage the notch in the rod when given a partial turn in combination with a perforated drip-plate held in place by said slide.

3. A drip-coffee pot made entirely of china comprising a lower portion to receive the drip and an upper part comprising a coffee-holder consisting of a receptacle, a perforated plate, a rod on which the plate is supported and which is formed with a flat side and with a notch near its edge, and a slide having a tooth movable freely longitudinally on said rod when opposite the flat side but which engages the notch when given a partial turn and thereby locks the side to the rod.

4. A coffee pot made entirely of china having a lower portion to receive the drip, and a receptacle having a bead or ledge at its lower end, a rod within said receptacle, perforated drip plates on the rod, one of which is supported on said ledge, slides on the rod for holding the drip-plates in place, and a perforated plate at the upper end of the receptacle which is adapted to rest on the body of coffee in the receptacle, but which is removable from the receptacle and may be supported on the ledge at the lower end thereof.

5. The combination with a coffee pot, of a coffee holder, comprising a receptacle for coffee, a supporting rod, a perforated drip plate thereon, a cover plate associated with the drip plate and mounted on the rod to turn about the axis thereof, and devices on the cover plate engaging devices on the perforated plate to limit the turning movement of said cover plate on the drip plate.

6. The combination with a coffee pot, of a coffee-holder comprising a receptacle for coffee, a supporting rod, a perforated drip-plate, carrying lugs and mounted on the rod, and a cover-plate mounted to turn on the rod and associated with the drip-plate and which is formed with a notch to engage said lugs on the drip-plate.

7. The combination with a coffee receptacle of a drip plate and a support with which it is detachably connected, said plate being removable from the receptacle, and said support comprising a rod having a flat side extending longitudinally thereof and formed with a notch near one edge, and a slide for holding the drip-plate in place on the rod, which is provided with a tooth adapted to slide freely on the flat side of the rod and to engage the notch on the rod when given a partial turn.

In testimony whereof, I have hereunto subscribed my name.

EDWIN S. GARDINER.